United States Patent Office 3,170,921
Patented Feb. 23, 1965

3,170,921
PREPARATION OF 9(11)-DEHYDRO-12-DESOXY SAPOGENINS
Joseph Elks, London, Gordon Hanley Phillipps, Greenford, Dennis Edward Clark, Worthing, David Arthur Thomas, Pinner, and Leslie Stephenson, Hanwell, London, England, assignors to Glaxo Laboratories Limited, Greenford, England, a British company
No Drawing. Filed July 5, 1963, Ser. No. 293,172
Claims priority, application Great Britain, Aug. 17, 1962, 31,720/62
19 Claims. (Cl. 260—239.55)

This invention is concerned with improvements in or relating to steroids and is in particular concerned with the preparation of 9(11)-dehydro-steroids and 3-esters thereof.

Sapogenins represent an important group of starting materials for the production of anti-inflammatory and other pharmacologically active steroids due to their occurrence an plants as their glycosides (sapogenins). However in order to utilise the sapogenins for this purpose it is necesary to subject them to various transformation steps in order to obtain intermediates having functional groups corresponding to the desired end products. The present invention is thus concerned with a sequence of steps involving the conversion of a 9(11)-dehydrothereof, to the corresponding 9(11)-dehydro-12-desoxy 12-keto steroid, particularly a sapogenin or a 3-ester compound, the latter being an important intermediate in the preparation of active steroids having C-ring substituents e.g. 9α-fluoro and 11β-hydroxy.

According to the invention there is provided a process which comprises the sequence of steps:
(A) reducing a 9(11)-dehydro-12-keto-steroid, particularly a sapogenin or a 3-ester thereof, to form a 9(11)-dehydro-12 (α or β)-hydroxy-steroid or a mixture of the 12-hydroxy epimers (the reduction preferably being effected with a borohydride or aluminum hydride of an alkali metal or an alkaline earth metal) and thereafter, if desired, converting the 12-hydroxy product to a 12-acylate e.g. 12-acetate.
(B) converting the product of A to the 12-halogeno (i.e. chloro or bromo) compound either as an individual epimer or a mixture of epimers, preferably by reaction with the appropriate hydrogen halide,
(C) reducing the product of B to form a 9(11)-dehydro-12-desoxy steroid.

We have found that the aforesaid sequence can be effected in good overall yield.

It should be noted that the stage C of the above sequence is per se novel and useful and is included within the scope of the invention as a separate embodiment.

Since hecogenin is a most important 12-keto steroid the invention will now be particularly described with reference to 9(11)-dehydro-hecogenin but it should be understood that the invention is not limited to the use of hecogenin derived starting materials the invention being, for example, also applicable to the transformation of other 9(11)-dehydro steroids e.g. 9(11)-dehydro botogenin.

Schematically, in the case of 9(11)-dehydro-hecogenin, the invention may thus be represented as follows:

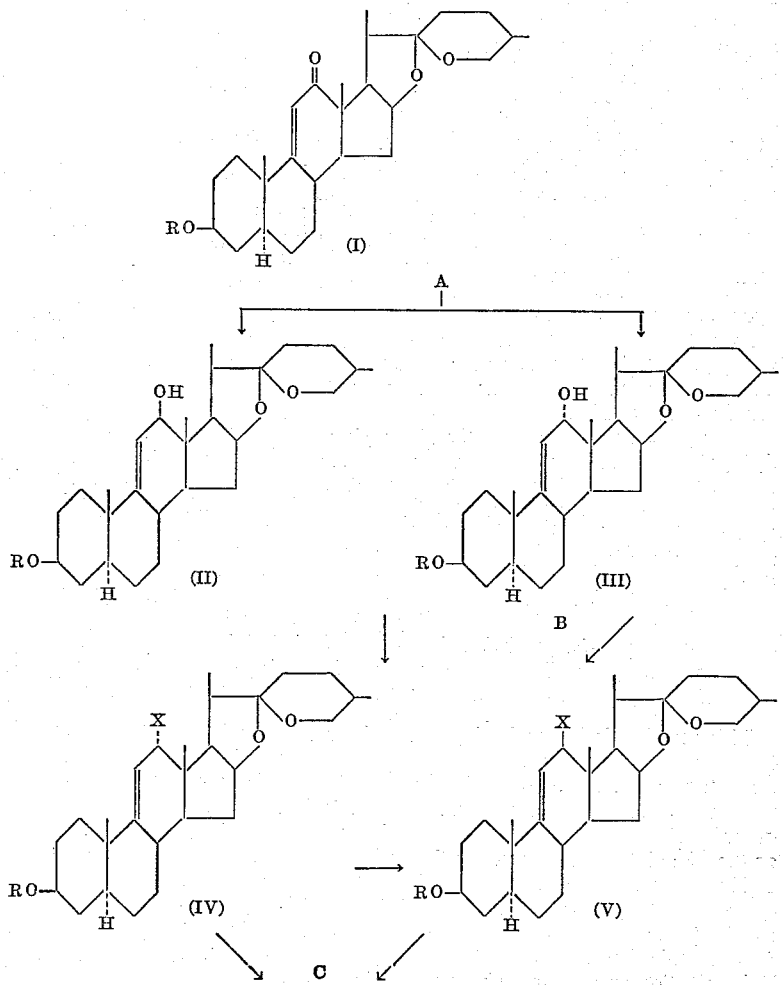

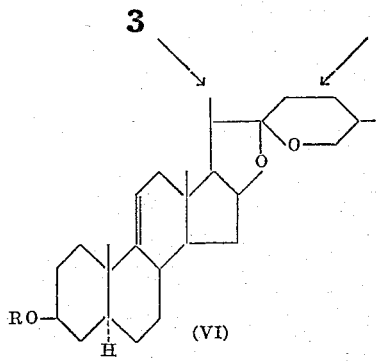

(VI)

wherein R is a hydrogen atom or an acyl group and X is a chlorine or bromine atom.

*Stage A.*—*Reduction of 9(11)-dehydrohecogenin (I) to the epimeric 9(11)-dehydro-12-hydroxy compounds (II) and (III)*

As stated above, this reaction is preferably effected with a borohydride or an aluminium hydride of an alkali metal or an alkaline earth metal of which group of compounds we find it convenient to use sodium borohydride. The starting steroid may be the 3-hydroxy or a 3-acyloxy compound and if the latter is used then, depending on the reaction conditions, the 3-acyloxy group may or may not be hydrolysed. From the point of view of overall efficiency of the process, it would seem to make little difference whether one starts with a 3-acyloxy compound and whether or not this is hydrolysed in situ.

Reduction with borohydrides other than lithium borohydride is preferably effected in a lower alkanol or a technical grade thereof such as industrial methylated spirit, the alkanol being, if desired, admixed with water. In order to improve the solubility of the steroid in the solvent this may contain a proportion of a cyclic ether e.g. dioxan or tetrahydrofuran. The borohydride will in general be used in excess of that theoretically required to effect the reduction and the reduction may conveniently be effected at a temperature ranging from ambient temperature to the reflux temperature of the solvent. The 3-acyloxy group, if present, may be hydrolysed during the reaction.

Lithium borohydride should be used in a non-hydroxylic solvent of which the cyclic ethers such as dioxan and tetrahydrofuran are preferred, otherwise reaction conditions will be as for other borohydrides.

The aluminium hydrides, particularly lithium aluminium hydride, react more vigorously than the borohydrides and the reduction should be effected in a non-hydroxylic solvent e.g. a cyclic ether such as dioxan or tetrahydrofuran otherwise the reaction conditions are similar to those used for the borohydrides.

The reduction product may then be acylated to provide the corresponding 12-acylates but on reaction in Stage B these will lead to a 12β-halogeno steroid as stated below.

The product of reduction of A will generally be a mixture of epimers which behave similarly in subsequent reactions and there is no advantage to be gained in separating them. Consequently one will in general use the epimeric mixture as the starting product for Stage B.

*Stage B.*—*Conversion of epimeric 9(11)-dehydro-12-hydroxy compounds (II) and (III) into the 12α-halogeno-epimer (IV) and the 12β-halogeno-epimer (V)*

This reaction is conveniently effected by reaction with the appropriate hydrogen halide, for example by adding a solution of the hydrogen halide in an inert organic solvent to a solution of the product of Stage A in an inert organic solvent. Whether one starts with the 12β-ol (II) or the 12α-ol (III) or a mixture thereof, the first product of reaction with the hydrogen halide is the 12α-halogeno compound (IV). However in the presence of hydrogen halide it tends to epimerize to the more stable 12β-epimer (V) though the rate depends markedly on the solvent. Epimerization appears to be encouraged in polar solvents, e.g. lower alkanols, and in the presence of such solvents it may be difficult to stop the reaction at the 12α-halogeno stage. Epimerization is very rapid and substantially complete with methanol but not quite so complete with ethanol although the rate of reaction is reasonably fast. If 12α-epimers are desired the reaction should preferably be effected in a non-polar organic solvent e.g. benzene or carbon tetrachloride.

One may thus, if desired, produce either the 12α- or 12β-halogeno compounds either of which, or a mixture thereof, may be used in the next stage.

The reaction can be effected at a temperature in the range of 0–50° C. but is conveniently effected at ambient temperature. Normally one will use a large excess of hydrogen halide.

Where the 12 (α or β)-hydroxy product of Stage A is converted to a 12 (α or β)-acylate it should be noted that the reaction product of Stage B will be a 12β-halogeno steroid.

The reaction may be effected in the presence or absence of a 3-acyloxy group but if this is present it may be hydrolysed during the reaction. The free hydroxy compounds (IV) and (V) can be acylated prior to Stage C but apart from permitting this to be effected at a rather higher concentration in certain solvents it is not particularly advantageous.

*Stage C.*—*Reduction of epimeric 9(11)-dehydro-12-halogeno compounds (IV) and (V) to 9(11)-dehydrotigogenin (VI)*

Either of the 12-halogeno epimers as 3β-ol or 3-acylate can then be reduced to 9(11)-dehydrotigogenin or a 3β-acylate. The reduction is preferably effected in solution or suspension in an inert organic solvent containing a base e.g. a tri-(lower alkyl) amine or an alkali metal salt of a lower alkanoic acid, e.g. sodium acetate, by catalytic hydrogenolysis, for example using a palladium hydrogenation catalyst or Raney nickel. Suitable solvents include ethyl acetate, tetrahydrofuran, benzene and dimethylformamide.

In place of catalytic hydrogenolysis one may effect reduction by means of an alkali metal or alkaline earth metal in liquid ammonia, a primary amine containing 1–5 carbon atoms or a polymethylene diamine.

By operating according to the preferred aspects of the process according to the invention we have been able to obtain very high overall yields of 9(11)-dehydrotigogenin by avoiding purification of the intermediates. The resulting material appears to be of good quality and in particular does not appear to be contaminated by 11-dehydrotigogenin.

The invention also includes within its scope compounds of the general formula

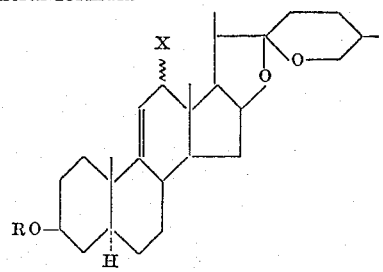

EXAMPLE 1—STAGE A

*Reductiton of 9(11)-dehydrohecogenin acetate*

(I) *With sodium borohydride in refluxing aqueous ethanol.*—9(11)-dehydrohecogenin acetate (40 g.) suspended in ethanol (500 ml.) was warmed to ca. 40° and treated with a solution of sodium borohydride (10 g.) in water (50 ml.). The mixture was boiled under reflux for 4 hr. Water (200 ml.) was then added and the solution was concentrated under reduced pressure to ca. 400 ml. More water (1 litre) was added and the mixture was allowed to stand at 5° for 2 hr. The product was filtered off, dried in vacuo at 60° overnight to yield a mixture of 9(11)-dehydrorockogenin and 9(11)-dehydro-epirockogenin (36.3 g., 99%), M.P. 204–208°, $[\alpha]_D$ −68.3°.

The crude diol (6 g.) was chromatographed on magnesium trisilicate (240 g.) made up in benzene. Elution with 5% ethyl acetate in benzene and subsequent crystallization from acetone gave 9(11)-dehydrorockogenin (3.9 g.), M.P. 208–212°, $[\alpha]_D$ −75°. (An analytical sample had C, 75.6; H, 9.7. Calc. for $C_{27}H_{42}O_4C$, 75.3; H, 9.8%.)

Elution with ethyl acetate and subsequent crystallization from methanol gave 9(11)-dehydro-epirockogenin (0.35 g.), M.P. 216–218°. (An analytical sample had C, 75.1; H, 9.65. Calc. for $C_{27}H_{42}O_4C$, 75.3; H, 9.8%.)

Acetylation of 9(11)-dehydrorockogenin (36 g.) with acetic anhydride and pyridine at 100° for 1½ hr. and subsequent crystallization from ether/hexane gave 9(11)-dehydrorockogenin diacetate (30.5 g.), M.P. 183–185°, $[\alpha]_D$ −108.9°. (Found: C, 72.1; H, 9.0. Calc. for $C_{31}H_{46}O_6C$, 72.3; H, 9.0%.)

Acetylation of 9(11)-dehydro-epirockogenin under the same conditions and subsequent crystallization from methanol gave the corresponding diacetate, M.P. 169–170°, $[\alpha]_D$ +67°. (Found: C, 72.5; H, 9.1. $C_{31}H_{46}O_6$ requires C, 72.3; H, 9.0%.)

(II) *With sodium borohydride in methanol-tetrahydrofuran at room temperature.*—9(11)-dehydrohecogenin acetate (0.5 g.) and sodium borohydride (0.1 g.) in a mixture of tetrahydrofuran (3 ml.) and dry methanol (3 ml.) were left at room temperature for 1¼ hr. The reaction product was poured into water, the solid collected and dried to give a mixture of the 3-acetates of 9(11)-dehydrorockogenin and 9(11)-dehydro-epirockogenin (0.49 g.), M.P. 206–212°, $[\alpha]_D$ −67°.

A similar mixture (5.88 g.) was chromatographed on magnesium trisilicate (240 g.) made up in benzene. Elution with 2–5% ethyl acetate in benzene and subsequent crystallization from methanol gave 9(11)-dehydrorockogenin 3-mono-acetate (3.65 g.), M.P. 242–245°, $[\alpha]_D$ −71°. (Found: C, 73.9; H, 9.4. $C_{29}H_{44}O_5$ requires C, 73.7; H, 9.4%.)

Elution with 50% ethyl acetate in benzene and subsequent crystallization from methanol gave 9(11)-dehydro-epirockogenin 3-mono-acetate (0.19 g.), M.P. 223–228°, $[\alpha]_D$ −20°. (Found: C, 73.5; H, 9.1. $C_{29}H_{44}O_5$ requires C, 73.7; H, 9.4%.)

(III) *With lithium borohydride in tetrahydrofuran.*— A solution of 9(11)-dehydrohecogenin acetate (0.5 g.) and lithium borohydride (0.25 g.) in tetrahydrofuran (10 ml.) was boiled under reflux for 1 hr. The reaction mixture was cooled and poured into water. The solid was collected and dried to give a mixture of 9(11)-dehydrorockogenin and its 12α-epimer (0.43 g.), $[\alpha]_D$ −62°.

EXAMPLE 2—STAGE B

*Preparation of 12α- and 12β-chloro-5α,25D-spirost-9(11)-en-3β-ol and their acetates*

(I) A solution of 9(11)-dehydrorockogenin (5.2 g.) in chloroform (80 ml.) was saturated at 10° with dry hydrogen chloride gas and allowed to stand at room temperature for 30 min. Evaporation in vacuo and trituration of the residue with ether gave 12α-chloro-5α,25D-spirost-9(11)-en-3β-ol (5.7 g.), M.P. 133–134°, $[\alpha]_D$ +20.2°. (Found, on an analytical sample: C, 72.6; H, 9.3; Cl, 7.8. $C_{27}H_{41}ClO_3$ requires C, 72.2; H, 9.2; Cl, 7.9%.)

Acetylation overnight at room temperature with pyridine and acetic anhydride and subsequent crystallisation from acetone gave the corresponding 3-acetate, M.P. 202–205°, $[\alpha]_D$ +53°. (Found: C, 71.1; H, 8.7; Cl, 7.2. $C_{29}H_{43}ClO_4$ requires C, 70.9; H, 8.8; Cl, 7.2%.)

(II) A 9.8 N solution of hydrogen chloride in dry methanol (53 ml.) was added slowly with stirring to a cooled suspension of 9(11)-dehydrorockogenin (5 g.) in dry methanol (48 ml.). After ca. 17 hr. at room temperature the suspension was added to water and the solid was collected and dried, giving 12β-chloro-5α,25D-spirost-9(11)-en-3β-ol (5.12 g., 98.5%), M.P. 206–208° $[\alpha]_D$ −93°. (Found: on an analytical sample: C, 71.8; H, 9.2; Cl, 8.1. $C_{27}H_{41}ClO_3$ requires C, 72.2; H, 9.2; Cl, 7.9%.)

Acetylation overnight at room temperature with pyridine and acetic anhydride and subsequent crystallisation from acetone gave the corresponding 3-acetate, M.P. 174–176°, $[\alpha]_D$ −83°. (Found: C, 71.15; H, 9.0; Cl, 6.9. $C_{29}H_{43}ClO_4$ requires C, 70.9; H, 8.8; Cl, 7.2%.)

(III) An 11 N solution of hydrogen chloride in dry methanol (165 ml.) was added over 5 min. with stirring to a cooled suspension of a mixture of 9(11)-dehydrorockogenin and 9(11)-dehydro-epirockogenin (18 g.) in dry methanol (195 ml.). After 18 hr. at room temperature the suspension was added to water (4 litres) and the solid was collected and dried. Crystallisation from acetone gave 12β-chloro-5α-25D-spirost-9(11)-en-3β-ol (11.6 g.), M.P. 204–207°, decomp., $[\alpha]_D$ −95°.

(IV) 9(11)-dehydrorockogenin 3-mono-acetate (1 g.) in dry, alcohol-free chloroform (20 ml.) was cooled and saturated with dry hydrogen chloride. After being left at room temperature for 1½ hr., the reaction mixture was evaporated in vacuo and the residue was crystallised from ether to give 3β-acetoxy-12α-chloro-5α,25D-spirost-9(11)-en; M.P. 182–185°, $[\alpha]_D$ +45.5°.

(V) An 11.4 N solution of hydrogen chloride in dry methanol (4.5 ml.) was added to a cooled suspension of 9(11)-dehydrorockogenin 3-mono-acetate (0.5 g.) in dry methanol (5.5 ml.). The reaction mixture was allowed to stand at room temperature overnight and then it was poured into water and the solid collected. Subsequent crystallisation from acetone gave 12β-chloro-5α,25D-spirost-9(11)-en-3β-ol (0.35 g.), M.P. 201–204°, $[\alpha]_D$ −96°.

(VI) 9(11)-dehydrorockogenin (1.3 g.) was dissolved in a saturated solution of hydrogen chloride in dry carbon tetrachloride and allowed to stand at room temperature for 1 hr. The reaction mixture was then evaporated to dryness in vacuo giving 12α-chloro-5α,25D-spirost-9(11)-en-3β-ol (1.56 g.), $[\alpha]_D$ +36.0°.

(VII) An 11.7 N solution of hydrogen chloride in dry methanol (4.3 ml.) was added with stirring to a suspension of 9(11)-dehydro-epirockogenin (0.5 g.) in dry methanol (5.7 ml.). After ca. 17 hr. at room temperature the suspension was poured into aqueous sodium hydrogen carbonate and the solid was collected and dried to give 12β-chloro-5α,25D-spirost-9(11)-en-3β-ol (0.51 g.), $[\alpha]_D$ −91.5°.

(VIII) A saturated solution of hydrogen chloride gas in dry ethanol (28 ml.) was added to a solution of 9(11)-dehydro-epirockogenin (0.5 g.) in dry ethanol (22 ml.)

and the mixture was stirred at room temperature for 4 min. The reaction mixture was then poured into aqueous sodium hydrogen carbonate solution and the solid collected and dried to give 12α-chloro-5α,25D-spirost-9(11)-en-3β-ol (0.43 g.), $[α]_D$ +27°.

(IX) An 8.4 N solution of hydrogen chloride in dry methanol (6 ml.) was added with stirring to a suspension of 9(11)-dehydrorockogenin diacetate (0.5 g.) in dry methanol (4 ml.). After 17 hr. at room temperature the suspension was poured into water and the solid collected and dried to give 12β-chloro-5α,25D-spirost-9(11)-en-3β-ol (0.415 g.), M.P. 206–208°, $[α]_D$ −90.3°.

(X) 9(11)-dehydro-epirockogenin diacetate (0.5 g.) was treated as in Example 2 (IX) to give 12β-chloro-5α,25D-spirost-9(11)-en-3β-ol (0.42 g.), M.P. 207–209°, $[α]_D$ −97.0°.

EXAMPLE 3—STAGE B

*12β-bromo-5α,25D-spirost-9(11)-en-3β-ol*

A suspension of 9(11)-dehydrorockogenin (5 g.) in a saturated solution of hydrogen bromide in dry methanol (100 ml.) was stirred at room temperature for ca. 21 hr. It was then poured into water and the solid was collected and dried to give the crude 12β-bromo compound (5.47 g.), $[α]_D$ −74.8°. Crystallisation from acetone gave 12β-bromo-5α,25D-spirost-9(11)-en-3β-ol, M.P. 188–192°, $[α]_D$ −97.2°. (Found: C, 65.9; H, 8.3; Br, 16.25. $C_{27}H_{41}BrO_3$ requires C, 65.7; H, 8.4; Br, 16.2%.)

EXAMPLE 4—STAGE C

*Dehalogenation of 12α- and 12β-chloro-5α,25D-spirost-9(11)-en-3β-ol and their acetates*

(I) A mixture of 12β-chloro-5α,25D-spirost-9(11)-en-3β-ol (10 g.), 5% palladium on carbon (1.0 g.), triethylamine (4.8 ml.) and tetrahydrofuran (110 ml.) was hydrogenated at room temperature and atmospheric pressure. The hydrogenation was complete after 1 hr. The reaction mixture was then filtered and the filtrate was evaporated in vacuo to small bulk. Water was added and the sloid was collected to give crude 9(11)-dehydrotigogenin (9.27 g., 100%), M.P. 177–184°, $[α]_D$ −59.2°. Crystallisation of 9.0 g of this material from methanol gave 9(11)-dehydrotigogenin (7.93 g., 88.3%), M.P. 187–190°, $[α]_D$ −59.5°. A second crop (D.357 g.) had M.P. 180–195°, $[α]_D$ −59.5°. Total yield 92%.

(II) 12β-chloro-5α,25D-spirost-9(11)-en-3β-ol (1 g.) was treated as in Example 4 (I) but with benzene (40 ml.) as solvent to give, after crystallisation from methanol, 9(11)-dehydrotigogenin (81%), M.P. 185–188°, $[α]_D$ −59.5°. A second crop had M.P. 181–184°. Total yield 88%.

(III) 12β-chloro-5α,25D-spirost-9(11-en-3β-ol (4.6 g.) was treated as in Example 4 (I), but with ethyl acetate (690 ml.) as solvent, to give, after crystallisation from methanol, 9(11)-dehydrotigogenin (87.5%), M.P. 188–190°, $[a]_D$ −59°. A second crop had M.P. 179–182°, $[α]_D$ −58.5°. Total yield 94.5%.

(IV) 12β-chloro-5α,25D-spirost-9(11)-en-3β-ol (1 g.) was treated as in Example 4 (I), but with dimethyl formamide (50 ml.) as solvent to give, after crystallisation from methanol, 9(11)-dehydrotigogenin (87%), M.P. 187–189°, $[α]_D$ −59°. A second crop had M.P. 180–184°. Total yield 94%.

(V) 12β-chloro-5α,25D-spirost-9(11)-en-3β-ol (0.5 g.) was treated as in Example 4 (I), but with ethanol (150 ml.) as solvent to give, after crystallisation from acetone, 9(11)-dehydrotigogenin (70%), M.P. 184–185°, $[α]_D$ −57.5°.

(VI) 12β-chloro-5α,25D-spirost-9(11)-en-3β-ol (0.5 g.) was treated as in Example 4 (V), but with Raney nickel (ca. 2 g.) as catalyst to give, after crystallisation from methanol, 9(11)-dehydrotigogenin (57%), M.P. 177–178°, $[α]_D$ −58.0°.

(VII) A mixture of 12β-chloro-5α,25D-spirost-9(11)-en-3β-ol (0.5 g.), 5% palladium on carbon (0.05 g.), fused sodium acetate (0.125 g.) and glacial acetic acid (40 ml.) was hydrogenated at room temperature and atmospheric pressure. The reaction mixture was filtered and the filtrate evaporated to low bulk. Water was added and the solid collected and dried to give 9(11)-dehydrotigogenin (0.465 g.), $[α]_D$ −59.5°.

(VIII) A mixture of 12α-chloro-5α,25D-spirost-9(11)-en-3β-ol (5.65 g.), 5% palladium on carbon (0.52 g.), triethylamine (1.66 ml.), and tetrahydrofuran (108 ml.) was hydrogenated at room temperature and atmospheric pressure. The reaction mixture was filtered and the filtrate was evaporated in vacuo to small bulk; water was added, and the solid was collected and dried to give crude 9(11)-dehydrotigogenin (4.85 g., 93%), M.P. 152–155°, $[α]_D$ −45.7°. Crystallisation from aqueous methanol gave 9(11)-dehydrotigogenin (3.34 g., 72%), M.P. 176–178°, $[α]_D$ −59.9°.

(IX) A mixture of 3β-acetoxy-12β-chloro-5α,25D-spirost-9(11)-en (0.5 g.), 5% palladium on carbon (0.05 g.), triethylamine (0.24 ml.), and ethyl acetate (25 ml.) was hydrogenated at room temperature and atmospheric pressure. The hydrogenation was complete in 1 hr. The reaction mixture was then filtered and the filtrate washed with water, dried and evaporated in vacuo. The residue (0.462 g.) was crystallised from ethyl acetate to give 9(11)-dehydrotigogenin acetate (0.409 g., 88%), M.P. 201–204°, $[α]_D$ −59°.

(X) A mixture of 3β-acetoxy-12α-chloro-5α,25D-spirost-9(11)-en (0.5 g.), 5% palladium on carbon (0.05 g.), triethylamine (0.24 ml.), and ethyl acetate (75 ml.) was hydrogenated at room temperature and atmospheric pressure. The hydrogenation was complete in 3 hr. Isolation in the usual way and crystallisation from ethyl acetate gave 9(11)-dehydrotigogenin acetate (0.389 g., 84%), M.P. 200–203°, $[α]_D$ −61°.

(XI) To a solution of sodium (0.56 g.) in liquid ammonia (100 ml.) was added over 5 min. a solution of 12α-chloro-5α,25D-spirost-9(11)-en-3β-ol (0.9 g.) in dry ether (50 ml.). After 30 min. stirring the excess sodium was destroyed wtih ammonium chloride and the ammonia was evaporated. The residue, after the addition of water, was extracted with chloroform. The extract was washed with water, dried and evaporated in vacuo to give crude 9(11)-dehydrotigogenin (0.76 g.), M.P. 168–170°. Acetylation of this product with acetic anhydride and toluene at 100° for 30 min. and subsequent crystallisation from ethyl acetate gave 9(11)-dehydrotigogenin acetate (0.54 g., 59%), M.P. 197–200°, $[α]_D$ −61.5°.

(XII) 12β-chloro-5α,25D-spirost-9(11)-en-3β - ol (3.0 g.) was treated as in Example 4(XI) to give crude 9(11)-dehydrotigogenin (2.865 g.), M.P. 163–167°. Acetylation and crystallisation from ethyl acetate gave 9(11)-hehydrotigogenin acetate (2.204 g., 72.0%), M.P. 193–200°.

EXAMPLE 5—STAGE C

*Dehalogenation of 12β-bromo-5α,25D-spirost-9(11)-en-3β-ol*

A mixture of 12β-bromo-5α,25D-spirost-9(11)-en-3β-ol (1 g.), 5% palladium on carbon (0.1 g.), triethylamine (0.32 ml.) and ethyl acetate (100 ml.) was hydrogenated at room temperature and atmospheric pressure. The hydrogenation was complete in 1 hr. Isolation in the usual way and crystallisation from methanol gave 9(11) - dehydrotigogenin (77%), M.P. 178–179°, $[α]_D$ −58.2°.

We claim:
1. A process which comprises the steps of reducing a 9(11)-dehydro-12 keto sapogenin to form a 9(11)-dehydro-12-hydroxy sapogenin, converting the 12 - hydroxy group to a 12-halogeno group selected from the group consisting of 12-chloro and 12-bromo groups and reducing the 12-halogeno group to form a 9(11)-dehydro-12-desoxy sapogenin.

2. A process as defined in claim 1 wherein the reduction of the 9(11)-dehydro-12-keto sapogenin is effected with a reducing agent selected from the group consisting of alkali metal borohydrides, alkaline earth metal borohydrides, alkali metal aluminium hydrides and alkaline earth metal aluminium hydrides.

3. A process as defined in claim 2 wherein the reduction is effected with sodium borohydride in a lower alkanol.

4. A process as defined in claim 1 wherein said 12-hydroxy group is converted to said 12-halogeno group by reaction with a hydrogen halide selected from the group consisting of hydrogen chloride and hydrogen bromide.

5. A process as claimed in claim 4 wherein the reaction is effected in a lower alkanol.

6. A process as defined in claim 4 wherein the reaction is effected at a temperature in the range of 0–50° C.

7. A process which comprises reducing a 9(11)-dehydro-12-halogeno sapogenin, wherein the halogeno group is slected from the group consisting of chlorine and bromine atoms, to form a 9(11)-dehydro-12-desoxy sapogenin.

8. A process as defined in claim 7 wherein the reduction of the 9(11)-dehydro-12-halogeno sapogenin is effected by catalytic hydrogenolysis using a catalyst selected from the group consisting of palladium and Raney nickel.

9. A process as claimed in claim 8 wherein the reaction is effected at least partly in solution in an inert organic solvent containing a base.

10. A process as claimed in claim 7 wherein the reduction of the 9(11)-dehydro-12-halogeno sapogenin is effected by means of metal selected from the group consisting of alkali metals and alkaline earth metals in a medium selected from the group consisting of liquid ammonia, primary amines containing 1–5 carbon atoms and polymethylene diamines.

11. In a process for the production of a 9(11)-dehydro-12-desoxy sapogenin from a 9(11)-dehydro-12-keto sapogenin, the step which comprises reacting a 9(11)-dehydro-12 - hydroxy sapogenin with a hydrogen halide selected from the group consisting of hydrogen chloride and hydrogen bromide to form a 9(11)dehydro-12-halogeno sapogenin.

12. In a process for the production of a 9(11)-dehydro-12-desoxy sapogenin from a 9(11)-dehydro-12-keto-sapogenin, the step which comprises reducing a 9(11)-dehydro-12-halogeno sapogenin, wherein the halogeno group is selected from the group consisting of chlorine and bromine atoms, by catalytic hydrogenolysis using a catalyst selected from the group consisting of palladium and Raney nickel, to form a 9(11)-dehydro-12-desoxy sapogenin.

13. A process which comprises the steps of reducing a 9(11)-dehydro hecogenin 3-lower alkanoate with a reducing agent selected from the group consisting of alkali metal borohydrides, alkaline earth metal borohydrides, alkali metal hydrides and alkaline earth metal aluminium hydrides to form a 12-hydroxy compound selected from the group consisting of 9(11)-dehydrorockogenin and 9(11)-dehydro - epirockogenin, reacting said 12 - hydroxy compound with a hydrogen halide selected from the group consisting of hydrogen chloride and hydrogen bromide to form the corresponding 12-halogeno compound and reducing said 12-halogeno compound by catalytic hydrogenolysis using a catalyst selected from the group consisting of palladium and Raney nickel, to form 9(11)-dehydrotigogenin.

14. A compound of the formula

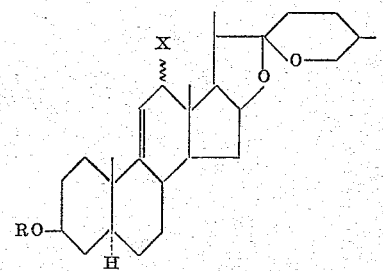

where X is selected from the group consisting of chlorine and bromine atoms and R is selected from the group consisting of hydrogen and lower alkanoyl groups.

15. 12α-chloro-5α,25D-spirost-9(11)-en-3β-ol.
16. 3β-acetoxy-12α-chloro-5α,25D-spirost-9(11)-en.
17. 12β-chloro-5α,25D-spirost-9(11)-en-3β-ol.
18. 3β-acetoxy-12β-chloro-5α,D-spirost-9(11)-en.
19. 12β-bromo-5α,25D-spirost-9(11)-en-3β-ol.

References Cited by the Examiner
FOREIGN PATENTS
211,785  12/57  Australia.

LEWIS GOTTS, *Primary Examiner.*